Patented Nov. 12, 1935

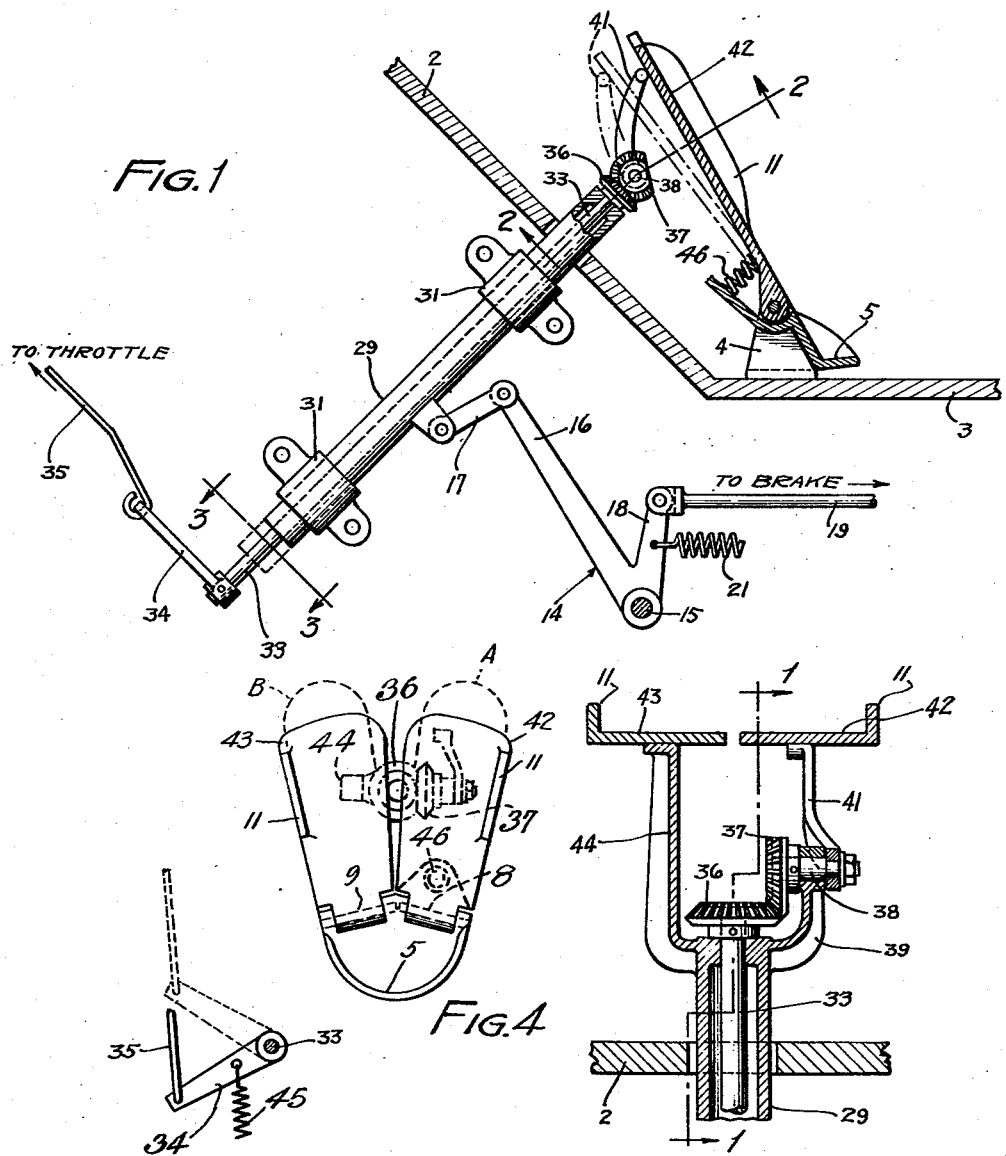

2,020,440

UNITED STATES PATENT OFFICE 2,020,440

CONTROL MECHANISM FOR MOTOR VEHICLES

Henry E. Stein, Mankato, Minn.

Application January 28, 1933, Serial No. 654,019

7 Claims. (Cl. 192—1)

This invention relates to an improved mechanism for controlling the operation of a motor vehicle, and other apparatus to which it may be applicable.

In the operation of an automobile, it is often necessary to stop the car in a comparatively short distance to avoid an accident. In the usual control mechanisms now commonly provided on automobiles, the engine throttle control pedal is usually situated adjacent to the brake pedal and at a lower elevation. This makes it necessary for the driver to bodily lift his foot each time he has to shift or move it from the throttle to the brake, which necessarily requires an interval of time. This interval is frequently of great importance in avoiding accidents. It is therefore desirable that the throttle and brake controls of the vehicle be so arranged that the interval required to shift from the throttle control pedal to the brake pedal, may be reduced to a minimum, whereby accidents may often be avoided.

It is an object of this invention to so arrange the engine throttle and brake control pedals, that the driver may quickly shift his foot from one control to the other, by a slight swinging or rocking movement of the foot, and without having to bodily lift the foot, whereby the brake may be instantly actuated, in case of an emergency, to quickly stop the car.

It is a further object of the invention to provide a control mechanism for the engine throttle and wheel brakes, comprising one or more pedals disposed in the same plane and so arranged that they may be selectively operated to control the movement of the vehicle without the operator having to bodily lift his foot from one pedal to another.

A further object is to provide a control mechanism for a motor vehicle, comprising a member mounted for longitudinal movement and having an operative connection with the wheel brake and supporting a throttle control member, and a pedal being provided for each of said control members whereby they may be operated independently of each other, and said pedals being pivotally mounted upon a suitable support having a foot-rest adapted to support the driver's foot, whereby the driver may conveniently swing his toe from one pedal to the other to selectively actuate said pedals, without removing his foot from said support.

A further object is to provide a simple and inexpensively constructed control mechanism for the throttle and brake of an automobile, which is positive and efficient in operation, and comprises one or more pedals so arranged that the driver may readily and conveniently switch his foot from one to the other without having to bodily lift his foot from said pedals.

Other objects of the invention reside in the particular arrangement of the foot pedals in connection with their supporting means, whereby the driver's foot will be so supported that he may readily swing his toe from one pedal to the other without loss of time; in the means provided whereby should the driver depress the throttle pedal at the same time that he depresses the foot pedal to apply the brakes of the vehicle, such movement of the throttle pedal may have no effect upon the engine throttle; and in the provision of a novel brake and throttle control mechanism for automotive vehicles, whereby the operation of handling the car is greatly simplified, which is highly desirable.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

In the drawing:

Figure 1 is a view diagrammatically illustrating the novel control mechanism herein disclosed, applied to an automotive vehicle, and taken substantially on the line 1—1 of Figure 2;

Figure 2 is a detail sectional view on the line 2—2 of Figure 1;

Figure 3 is a cross-sectional view on the line 3—3 of Figure 1;

Figure 4 is a plan view of the control pedals shown in Figure 1;

In the preferred embodiment of the invention, shown in Figures 1, 2, and 4, there is diagrammatically illustrated the usual floor boards 2 and 3 of a conventional automobile, upon one of which a suitable pedal support 4 is secured, which support has an adjustable foot-rest 5, as best shown in Figure 1. Pedals 42 and 43 are pivotally mounted upon the support 4 by suitable pivots 8 and 9, respectively. Each pedal is shown provided with an upstanding portion or flange 11 adapted to be engaged by the sole of the driver's shoe, to thereby limit its swinging movement, when shifting from one pedal to the other, as will subsequently be described.

The means for actuating the usual wheel brake of the vehicle is shown comprising a tubular member 29 mounted for sliding movement in suitable guides 31, suitably secured to the engine frame or chassis, not shown. These guides, it is to be understood, are fixed and the member 29 slides longitudinally therein. A suitable bell crank 14 is secured to the usual brake shaft 15 and is shown having one arm 16 operatively connected to the tubular member 29 by a link 17. The opposite arm 18 of the bell crank 14 is shown connected to one end of a rod 19, the opposite end of which may be connected to the usual wheel brake of the vehicle. A spring 21 is shown connected to the arm 18 of the bell crank, and normally holds the tubular member 29 in its elevated position assumed when the brake is released. The upper end of the tubular member 29 has an upright extension 44 positioned to be engaged by the pedal 43, as clearly shown in Figure 2.

By this arrangement, when the pedal 43 is depressed, the member 29 will be moved downwardly in the guides 31 to thereby cause actuation of the bell crank 14, with the resultant actuation of the wheel brakes which, as hereinbefore stated, are operatively connected thereto.

The means for actuating the engine throttle comprises a rod 33 rotatably mounted within the member 29 and having an arm 34 secured to its lower end which may be connected to the usual throttle by a suitable connection 35. The upper end of the rod 33 has a bevel gear 36 which meshes with a gear segment 37 secured to a short stub shaft 38, rotatably mounted in a bracket 39 provided upon the tubular member 29.

When the mechanism is operated to apply the brake, the tubular member 29 is moved downwardly, which causes the arm 41, normally engaged with the throttle control pedal 42 to move out of engagement with said pedal. When the brake pedal is released, the tubular member 29 will return to its normal position, shown in Figures 1 and 2, by the action of the spring 21, whereby the arm 41 of the throttle is returned to its normal position in engagement with the throttle pedal 42, after which the throttle may be conveniently actuated by simply depressing the foot pedal 42. A suitable spring 46 may be provided to retain the throttle pedal 42 in its normal elevated position, shown in full lines in Figure 1.

The throttle and brake pedals 42 and 43, respectively, are so arranged that should the driver, when depressing the brake pedal 43 to apply the brakes, at the same time, depress the throttle pedal, such depression of the throttle pedal will have no effect upon the throttle, unless the driver tilts his foot with respect to the brake pedal 43 to thereby further depress the throttle pedal 42. The brake pedals 42 and 43, it will be noted, by reference to Figure 2, are disposed in the same plane when in normal inoperative positions and are angularly disposed with respect to one another and so spaced apart that the operator may readily swing his toe from the position indicated by the broken lines A to the position B, without removing his foot from the foot rest 5. The pedals are so spaced that the operator may conveniently manipulate either pedal independently of the other, but because of the arm 41 of the throttle pedal 42 being supported directly upon the tubular member 29, should the operator accidentally depress the throttle pedal when he depresses the brake pedal, no movement will be imparted to the throttle, as hereinbefore stated, unless the driver relatively tilts his foot upon the brake pedal to thereby further depress the throttle pedal.

The arm 41 engaging the throttle pedal 42, may be yieldably retained in its normal position, as shown in full lines in Figure 1, by a suitable spring 45, shown in Figure 3.

The novel invention herein disclosed greatly simplifies the operation of controlling the movement of a motor vehicle in that the driver need not remove his foot from the control pedals, that is, the throttle and the brake, as is now customary, when operating automobiles equipped with ordinary control means. Its construction is very simple and inexpensive and may readily be applied to an automobile at small cost in lieu of the usual control means now commonly provided upon such vehicles.

I claim as my invention:

1. In a mechanism for controlling the operation of a motor vehicle comprising an engine throttle and a brake, a tubular member mounted for movement in suitable guides and having an operative connection with said brake, a rod mounted for rotary movement within said tubular member and having an operative connection with the engine throttle, a gear device operatively connected with the upper end of said rod and having an operating arm, a foot pedal engaged with said arm whereby the latter may be actuated to rotate said rod and operate the engine throttle, a separate pedal operatively associated with said tubular member whereby the latter may be longitudinally translated to actuate the brake, and a support for said pedals having a foot-rest for supporting the heel of the driver's foot whereby he may readily swing his toe from one pedal to the other without removing his foot from said foot rest, said throttle control pedal being mounted independently of said brake pedal and so arranged that the brake pedal may be depressed, without actuating the throttle pedal.

2. In a mechanism for controlling the operation of a motor vehicle comprising an engine throttle and a brake, a member mounted for longitudinal movement and having an operative connection with said brake, a rod supported by said member and adapted for relative rotation with respect thereto and having an operative connection with the engine throttle, a pedal for longitudinally translating said member to set the brake, another pedal having an operative connection with said rod and adapted to impart rotary movement thereto when actuated, a support common to said pedals and the driver's foot, and the connections between said pedals and said member and rod being such that the pedals are disposed in substantially the same plane, when in inoperative positions, whereby the driver may readily swing his toe from one pedal to the other, thereby to selectively actuate the same, and the throttle pedal being so arranged with respect to the brake pedal, that when the latter is depressed to set the brakes, the throttle pedal may also be depressed without imparting rotary motion to said rod.

3. In a mechanism for controlling the operation of a motor vehicle comprising an engine throttle and a brake, a member mounted for longitudinal movement and having an operative connection with said brake, a rod supported in said member and adapted for relative rotation therein, said rod having an operative connection with the engine throttle, a pedal for longitudinally translating said member to set the brake, another pedal having a geared connection with said rod and adapted to impart rotary movement thereto when actuated, and a support common to said pedals and the driver's foot, and whereby the driver may readily swing his toe from one pedal to the other, when said pedals are in inoperative positions, thereby to selectively actuate said pedals, and the throttle pedal being so arranged with respect to the brake pedal, that it may be depressed simultaneously therewith without affecting the throttle.

4. In a mechanism for controlling the operation of a motor vehicle comprising a brake and an engine throttle, a member having an operative connection with the brake and adapted for longitudinal movement, a shaft mounted in said member and movable therewith, means connecting said shaft to the throttle, a brake pedal for longitudinally translating said member, a lever pivoted on said member and having an operative connection with said shaft, a throttle pedal for oscillating said lever to thereby rotate the shaft and actuate the throttle, and a support for said pedals whereby they are disposed in the same plane, when in inoperative positions, and whereby the driver may conveniently swing his toe from one pedal to the other to independently operate said pedals, and the driving connection between the throttle pedal and said rod being such that should the driver depress both pedals at the same time, when applying the brakes, no movement is imparted to the throttle unless the driver tilts his foot to thereby further depress the throttle pedal.

5. In a mechanism for controlling the operation of a motor vehicle comprising a brake and an engine throttle, a member having an operative connection with the brake and adapted for longitudinal movement, a shaft mounted in said member and movable therewith, means connecting said shaft to the throttle, a brake pedal for longitudinally translating said member, a lever pivoted on said member and having an operative connection with said shaft, a throttle pedal for oscillating said lever to thereby rotate the shaft and actuate the throttle, a support for said pedals independent of said member and on which the pedals are normally positioned in the same plane, and means whereby the throttle pedal may be depressed simultaneously with the brake pedal without affecting the throttle.

6. In a mechanism for controlling the operation of a motor vehicle comprising a brake and an engine throttle, a member having an operative connection with the brake and adapted for longitudinal movement, a shaft supported by said member and movable therewith, means connecting said shaft to the throttle, a brake pedal for longitudinally translating said member, a lever pivoted on said member and having an operative connection with said shaft, a throttle pedal for oscillating said lever to thereby rotate the shaft and actuate the throttle, and a support common to said pedals and having a heel rest for the driver's foot whereby he may conveniently swing his toe from one pedal to the other to independently operate said pedals, and said lever being supported on said longitudinally movable member, whereby when said member is moved downwardly, by depression of the brake pedal to set the brake, said throttle pedal may be simultaneously depressed without relatively moving said lever.

7. In a mechanism for controlling the operation of a motor vehicle comprising a brake and an engine throttle, a movable member having an operative connection with the vehicle brake, a second member supported by said first member and movable relatively thereto and connected to the engine throttle, foot pedals connected respectively to said members and normally disposed in a given plane, a foot rest supporting said pedals whereby they may be operated independently of one another, and said pedals being so arranged that should both be depressed when applying the brake, the throttle will not be affected unless the driver tilts his foot and relatively moves the throttle pedal with respect to the brake pedal.

HENRY E. STEIN.